United States Patent
Weitbruch et al.

(10) Patent No.: US 7,911,545 B2
(45) Date of Patent: Mar. 22, 2011

(54) METHOD AND APPARATUS FOR PROCESSING VIDEO PICTURES, IN PARTICULAR IN FILM MODE SEQUENCES

(75) Inventors: Sébastien Weitbruch, Kappel (DE); Cédric Thebault, Villingen-Schwenningen (DE); Ingo Doser, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 987 days.

(21) Appl. No.: 10/583,211

(22) PCT Filed: Dec. 14, 2004

(86) PCT No.: PCT/EP2004/053442
§ 371 (c)(1),
(2), (4) Date: May 8, 2007

(87) PCT Pub. No.: WO2005/059878
PCT Pub. Date: Jun. 30, 2005

(65) Prior Publication Data
US 2007/0279324 A1 Dec. 6, 2007

(30) Foreign Application Priority Data
Dec. 17, 2003 (EP) .................................. 03104759

(51) Int. Cl.
*H04N 3/12* (2006.01)
*H04N 5/21* (2006.01)
*H04N 3/27* (2006.01)
*G09G 5/10* (2006.01)

(52) U.S. Cl. ........ 348/797; 348/554; 348/607; 348/910; 345/63; 345/692

(58) Field of Classification Search .................. 348/797, 348/441, 554, 607, 687, 910; 345/60, 63, 345/691–693
See application file for complete search history.

(56) References Cited

U.S. PATENT DOCUMENTS
5,398,071 A * 3/1995 Gove et al. .................... 348/558
(Continued)

FOREIGN PATENT DOCUMENTS
EP 0982708 3/2000
(Continued)

OTHER PUBLICATIONS
Search Report Dated Jul. 7, 2005.

*Primary Examiner* — Victor Kostak
(74) *Attorney, Agent, or Firm* — Robert D. Shedd; Harvey D. Fried; James McKenzie

(57) ABSTRACT

The invention relates to a method for processing video pictures, the video pictures consisting of pixels digitally coded, the digital code word determining the length of the time period during which the corresponding pixel of a display is activated, wherein to each bit of a digital code word a certain activation duration called sub-field is assigned, the sum of the duration of the sub-fields according to a given code word determining the length of the time period during which the corresponding pixel is activated, said method comprising the following steps:
  detecting the video pictures source mode and the parity between pictures,
  if the source is in film mode, distributing the total number of sub-fields used for two frame raster in three groups of sub-fields and assigning to a value of a pixel a code word that corresponds to the distribution of the active sub-fields period over the three sub-fields groups, and
  if the source is in camera mode, distributing the total number of sub-fields used for each frame raster in two groups of sub-fields and assigning to a value of a pixel a code word that corresponds to the distribution of the active sub-fields period over the two sub-fields groups.

The invention is applicable to all kinds of displays based on the principle of duty cycle modulation.

8 Claims, 6 Drawing Sheets

U.S. PATENT DOCUMENTS

| | | | |
|---|---|---|---|
| 5,731,802 A * | 3/1998 | Aras et al. | 345/692 |
| 5,886,640 A * | 3/1999 | Wang et al. | 340/635 |
| 6,052,122 A * | 4/2000 | Sutcliffe et al. | 715/751 |
| 6,151,011 A * | 11/2000 | Worley et al. | 345/692 |
| 6,542,135 B1 * | 4/2003 | Kasahara et al. | 345/63 |
| 6,759,999 B1 * | 7/2004 | Doyen | 345/63 |
| 6,831,618 B1 * | 12/2004 | Suzuki et al. | 345/60 |
| 6,985,164 B2 * | 1/2006 | Rogers et al. | 345/692 |
| 7,187,392 B2 * | 3/2007 | Ito | 345/690 |
| 2005/0253972 A1 * | 11/2005 | Wwitbruch et al. | 348/797 |

FOREIGN PATENT DOCUMENTS

| | | |
|---|---|---|
| EP | 1359749 | 11/2003 |

* cited by examiner

METHOD AND APPARATUS FOR PROCESSING VIDEO PICTURES, IN PARTICULAR IN FILM MODE SEQUENCES This application claims the benefit, under 35 U.S.C. §365 of International Application PCT/EP2004/053442, filed Dec. 14, 2004, which was published in accordance with PCT Article 21(2) on Jun. 30, 2005 in English and which claims the benefit of European patent application No. 03104759.0 filed Dec. 17, 2003.

The invention relates to a method and an apparatus for processing video pictures, more particularly but not exclusively, video pictures in film mode sequences.

More specifically, the invention relates to a video processing method for improving the picture quality of pictures which are displayed on matrix displays such as plasma display panels (PDP), display devices with digital micro mirror arrays (DMD) and all kinds of displays based on the principle of duty cycle modulation (pulse width modulation of light emission).

BACKGROUND OF THE INVENTION

The present invention will be described in relation with plasma display panel. A plasma display panel utilises a matrix array of discharge cells, which could only be switched ON or OFF. Also unlike a CRT or LCD in which grey levels are expressed by analogue control of the light emission, in a PDP, modulating the number of light pulses per frame controls the grey level. The eye will integrate this time-modulation over a period corresponding to the eye time response.

For static pictures, this time-modulation, repeats itself, with a base frequency equal to the frame frequency of the displayed video norm. As known from the CRT-technology, a light emission with base frequency of 50 Hz, introduces large area flicker, which can be eliminated by field repetition in 100 Hz CRT TV receivers.

Contrary to the CRTs, where the duty cycle of light emission is very short, the duty cycle of light emission in PDPs is ~50% for middle grey. This reduces the amplitude of the 50 Hz frequency component in the spectrum, and thus large area flicker artefact, but due to the larger size of PDPs, with a larger viewing angle, even a reduced large area flicker becomes objectionable in terms of picture quality. The present trend of increasing size and brightness of PDPs, will also contribute to aggravate this problem in the future.

To avoid the large area flicker artefact in PDPs, a specific video processing method has been proposed in EP patent application Nr 0982708 in the name of Deutsche Thomson Brandt. The method that will be described hereafter more in detail, consists of optimising sub field organisation for the frame period. The sub-fields of a frame are organised in two consecutive sub-fields groups and to a value of a pixel, a code word is assigned, which distributes the active sub-field periods equally over the two sub-fields groups. If this solution is optimised for so-called camera mode sources, specific optimisation can be realized to improve the overall picture performance, in case of film mode sources.

INVENTION

The present invention consists of a method and an apparatus that reduces the large area flicker artefact in PDPs, in particular for video signals provided by film mode sources, without incurring a lot of extra costs.

So the present invention consists of a method for processing video pictures, the video pictures consisting of pixels digitally coded, the digital code word determining the length of the time period during which the corresponding pixel of a display is activated, wherein to each bit of a digital code word a certain activation duration called sub-field is assigned, the sum of the duration of the sub-fields according to a given code word determining the length of the time period during which the corresponding pixel is activated. The method of the present invention comprises the following steps:

Detecting the video pictures source mode and the parity between pictures

If the source is in film mode, distributing the total number of sub-fields used for two frame raster in three groups of sub-fields, and assigning to a value of a pixel, a code word that distributes the active sub-fields period over the three sub-fields groups.

According to one embodiment, each group of sub-fields comprises a number of sub-fields equal or different by one.

According to another embodiments, the three groups of sub-fields have identical structure at least in terms of the most significant sub-fields or the three groups of sub-fields have identical structure at least in terms of the least significant sub-fields.

According to another feature of the present invention, the change of coding from the coding used in camera mode to the coding used in film mode is made at the next frame following the detection of a change between the source type. However, the change of coding from the coding used in film mode to the coding used in camera mode is made using the following steps:

If in a two-frame raster, the first picture is in film mode and the second picture is in camera mode, add at the beginning of the second frame, a sub-field having a weight corresponding to the missing energy to obtain a correct first picture, Code the second picture using two groups of sub-fields with a total number of sub-fields less than the usual one, then Code the following pictures using two groups of sub-fields with a total number of sub-fields equal to the usual one.

The invention also relates to an apparatus for processing video pictures, the video pictures consisting of pixels digitally coded, the digital code word determining the length of the time period during which the corresponding pixel of a display is activated, wherein to each bit of a digital code word a certain activation duration called sub-field is assigned, the sum of the duration of the sub-fields according to a given code word determining the length of the time period during which the corresponding pixel is activated, said apparatus comprising a gamma block (1), the signal from the gamma block being sent in parallel to a classical signal processing circuit and to a mode detection block (3), the signal from the mode detection block being sent to a coding selection block (4) that sent a selection signal to a block (5) comprising the various coding LUT (Look Up Table) to select the right LUT.

DRAWINGS

Exemplary embodiments of the invention are illustrated in the drawings and are explained in more detail in the following description.

EXEMPLARY EMBODIMENTS

The concept used in EP 0982708 is explained with reference to FIG. 1 in the case of a camera mode source and with reference to FIG. 2 in the case of a film mode source.

Figure 1:
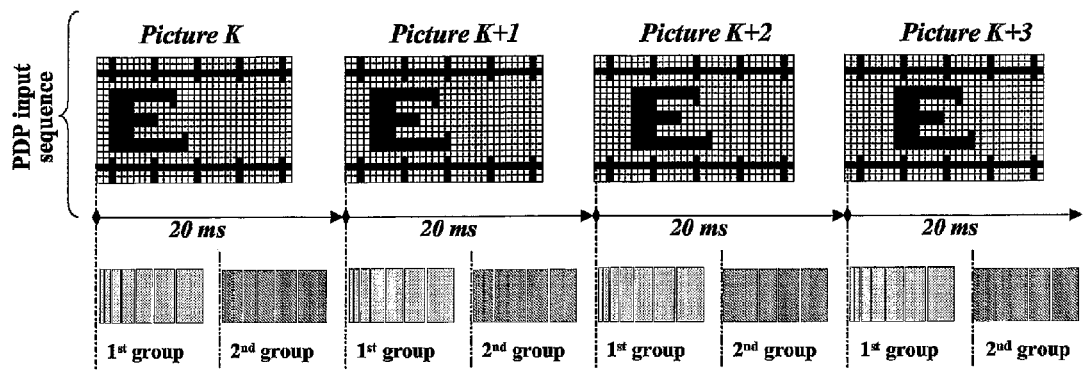
FIG. 1 shows an illustration for explaining the coding concept used on camera mode sources as explained in EP A 0982708.

As shown in FIG. 1, the number of sub-fields has been selected to be 14 for a frame period of 20 ms in 50 Hz video standards. In fact, the frame period for 60 Hz being 16.6 ms, it is larger for 50 Hz video standards, allowing the addressing of more sub-fields. In this case, as explained in EP 0982708, the sub-fields are structured in two groups of 7 sub-fields referenced first group and second group. In the example of FIG. 1, the 2 sub-fields groups are coded as 1-2-6-12-20-30-43 and 1-4-9-16-25-36-50. According to another embodiment, the 2 sub-fields groups may be identical in terms of the most significant sub-fields and different in terms of the least significant sub-fields. So, when the concept is used with input picture on the flat panel, changing each 20 ms as shown in FIG. 1 by the black letter "E" moving each time of two pixels from picture K to picture K+3, the code generates an artificial doubling of the frame frequency since the input frame rate has been decomposed in two sub-parts, each one including a similar sub-field structure. Following that concept the new main frequency perceived by the eye is no more 50 Hz but 100 Hz that is almost no more perceptible.

Figure 2:
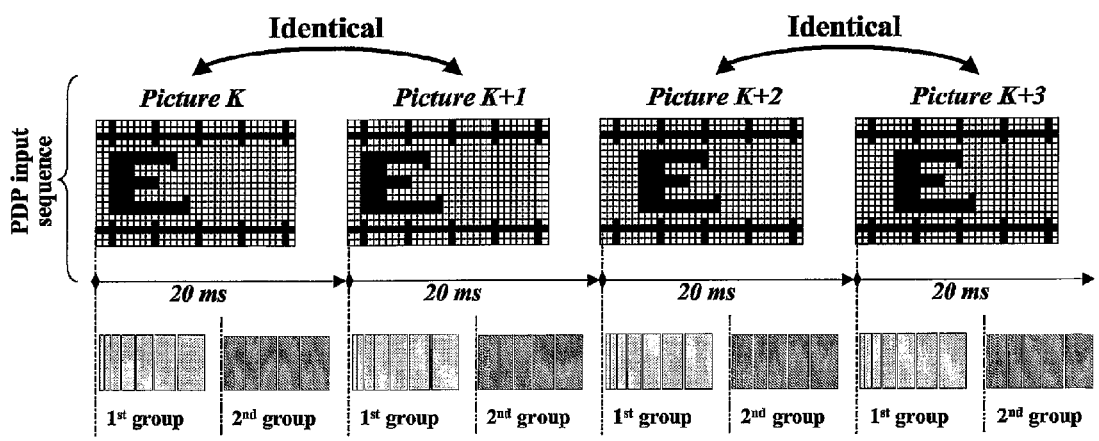
FIG. 2 shows an illustration for explaining the coding concept developed in EP A 0982708 with film mode sources.

In FIG. 2, the same concept has been applied to a film mode source. In the film industry, progressive pictures are taken at the low rate of 24 images per second (24 Hz). In theatres, those pictures are mainly repeated in order to increase artificially the refresh rate to suppress any inconvenient coming from large area flickering. In Europe, the common refresh rate for broadcasting is 50 Hz interlaced. Then, films will be displayed a bit quicker (ratio 25/24) in order to dispose of 25 complete pictures per second. At the end, each of these 25 pictures will be repeated twice to reach 50 pictures per second (50 Hz). Finally, the conversion of this 50 Hz format into interlace for broadcasting is done by simply extracting the odd and even lines from the converted sequence. The odd lines and even lines are extracted from the same progressive picture so that a conversion back to progressive can be done easily by simply recombining the odd and even lines. This de-interlacing method is mainly called "field-insertion". In order to do that, it is important to detect whether the sequence is a film-mode sequence or not and which fields should be matched together (parity detection). Indeed, the wrong combination between fields would have dramatic results. Analysing the intra-field motion will do the film-mode detection and the parity detection. Although, two fields coming from the same source will have a lot of similarities. Then, for a film-mode format, the result of an intra-field motion analysis should lead to the following results: NO-MOTION-MOTION—NO-MOTION—MOTION—NO_MOTION—MOTION . . .

FIG. 2 shows the use of the concept described above on film mode sequences. This concept is based on two groups of sub-fields included in a 20 ms frame raster. FIG. 2 shows that Picture K and Picture K+1 are identical as well as Picture K+2 and Picture K+3. So the optimised sub-field structure can be spread on both Picture K and Picture K+1. Consequently, a 40 ms frame raster may be used, in the case of film mode material, since there is no motion between the two input pictures issued from odd and even fields. This situation can be easily detected by analysing the motion between two consecutive pictures.

The present invention proposes to use a specific film mode coding on a 40 ms frame raster, once the film mode sequences have been detected. According to the invention, the total number of sub-fields used in two frames is divided in three groups of sub-fields, each group having the same number or not of sub-fields. In that case, the new frame frequency is 75 Hz (3 groups/40 ms). This enables to reduce enough the flicker for current applications and gives more flexibility in the choice of sub-fields. In the present invention, there are 40 ms for three groups of sub-fields. By such means, it is possible to find a code that is much better in terms of false contour behavior and grey scale portrayal.

Figure 3:
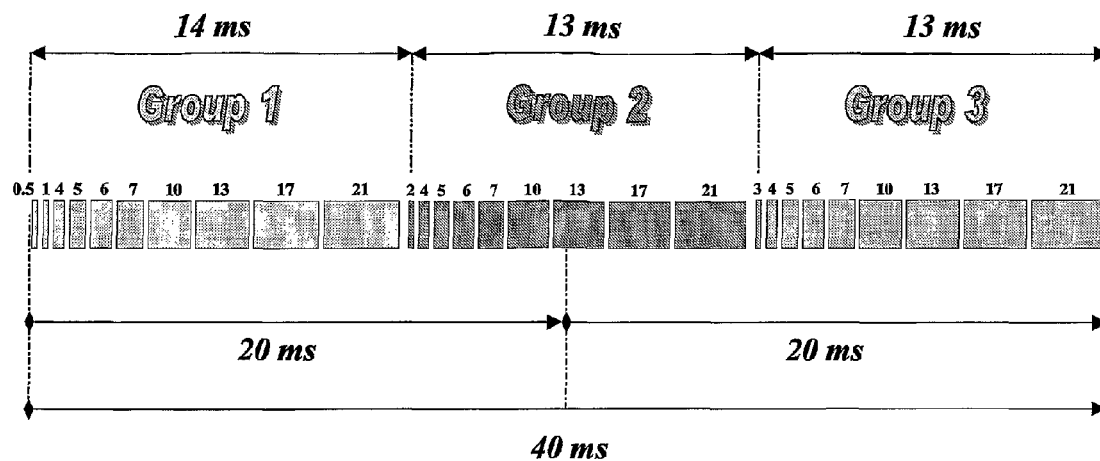
FIG. 3 shows a new sub-field organisation according to one embodiment of the present invention.
Figure 4:
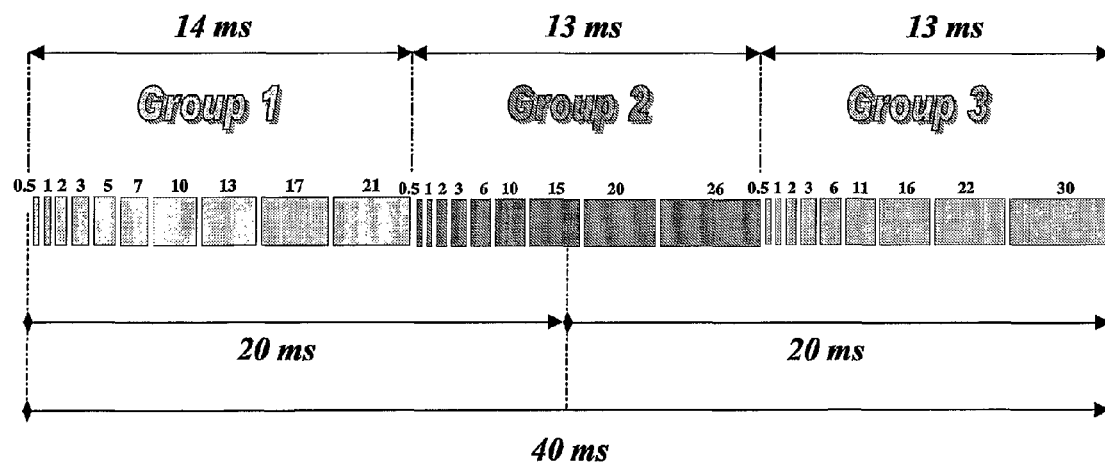
FIG. 4 shows a new sub-field organisation according to another embodiment of the present invention.

In FIGS. 3 and 4, two examples of the concept of the present invention are given. In both cases, a 14 sub-fields structure is used in 20 ms frame raster. So on 40 ms frame raster, there are exactly 28 sub-fields without any lost in terms of brightness.

FIG. 3 shows an example of possible implementation of the concept of the invention using 28 sub-fields and having major MSBs equal. Only some LSBs are different. The first group contains 10 sub-fields whereas the two other groups contain only 9 sub-fields.

The weights of the example are given again below:

Group 1: 0.5-1-4-5-6-7-10-13-17-21 (10 sub-fields)
Group 2: 2-4-5-6-7-10-13-17-21 (9 sub-fields)
Group 3: 3-4-5-6-7-10-13-17-21 (9 sub-fields)
The sum of the all weights is equal to 255.5.

In this example, there is absolutely no flicker for middle-gray and high-gray levels but flicker can be seen in low levels since the weight 0.5, 1, 2 and 3 are repeated only every 40 ms.

FIG. 4 shows an example of possible implementation of the concept using 28 sub-fields and having major LSBs equal. Only the rest of MSBs are different. The first group contains 10 sub-fields whereas the two other groups contain only 9 sub-fields.

The weights of this example are given again below:

Group 1: 0.5-1-2-3-5-7-10-13-17-22 (10 sub-fields)
Group 2: 0.5-1-2-3-6-10-15-20-26(9 sub-fields)
Group 3: 0.5-1-2-3-6-11-16-22-30(9 sub-fields)
The sum of the all weights is equal to 255.5.

In this example, there is absolutely no flicker for low-gray levels and it is also possible to have almost no flickering on the other levels by simply choosing their code words in order to minimize the Fourier component linked to low frequencies (25 Hz and 50 Hz).

This last example will be used for all further explanations.

Figure 5:
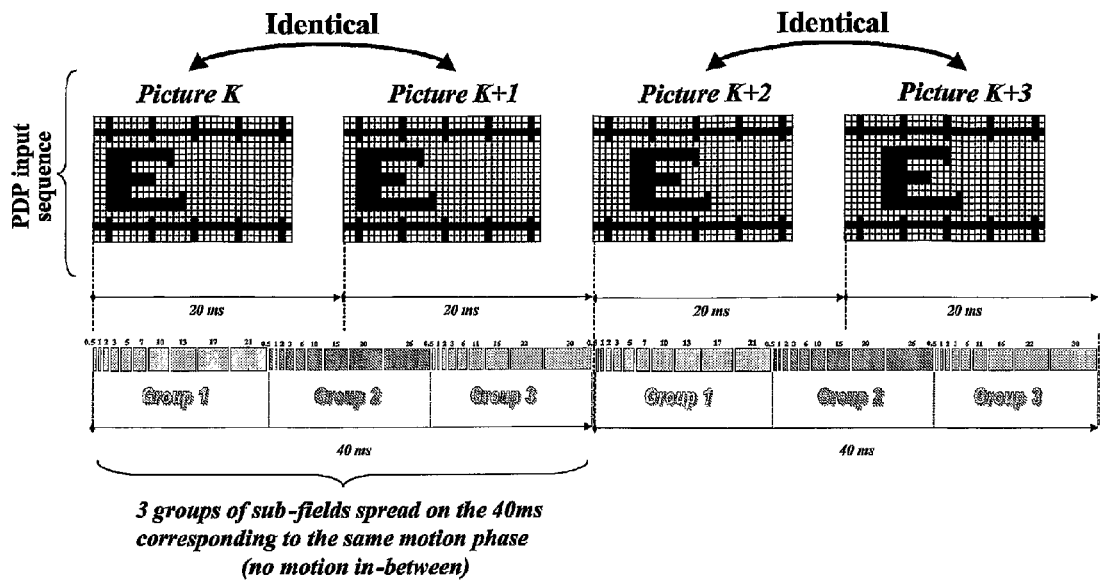
FIG. 5 shows an illustration of the use of the sub-field organisation of FIG. 4 on film mode sources.
Figure 6:
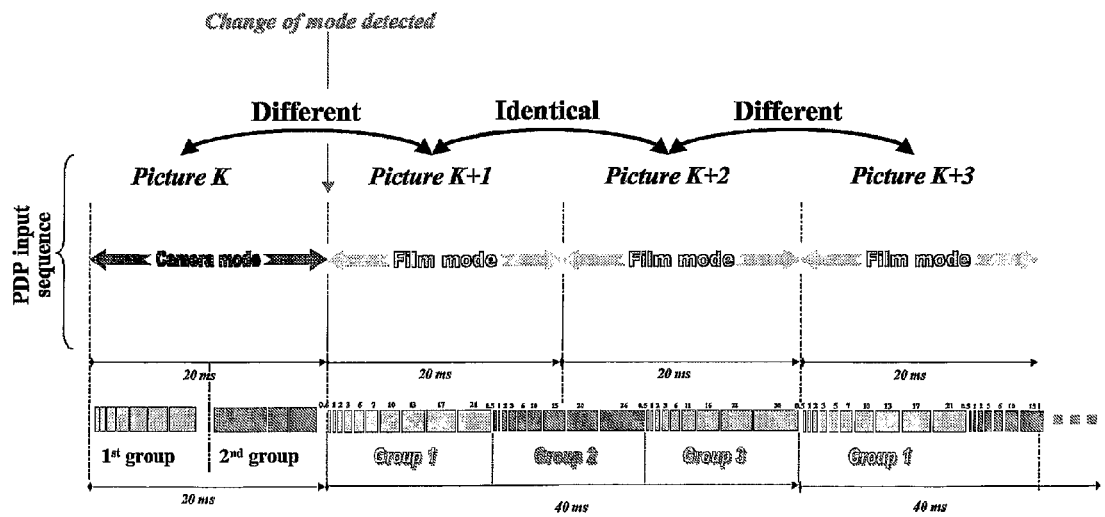
FIG. 6 shows the switch from camera mode to film mode coding.

The use of the new concept on film mode sequences is shown on FIG. 5. In this figure, the pictures sequence is such that Picture K is identical to Picture K+1 and Picture K+2 is identical to Picture K+3. Each group of two pictures is displayed on a 40 ms frame raster. The new concept is based on 3 groups of sub-fields Group 1, Group 2 and Group 3, included in a 40 ms frame raster. Since there is no motion between the two input pictures issued from odd and even fields inside this 40 ms period, the optimised sub-field structure can be spread on the two identical pictures. As in the 40 ms frame raster, the first and second pictures are the same; only the first picture is coded with all the sub-fields of the 3 groups.

In the example, the three groups have respectively 10 sub-fields, 9 sub-fields and 9 sub-fields. The weights of the sub-fields are the same as those of FIG. 4. However, it is obvious that the total number of sub-fields may be equally divided in the 3 groups or not. The only rule for the choice of the sub-fields number by group and the sub-fields weights is to avoid low frequency flicker (24 or 25 Hz), which can be foreseen by a Fourier analysis.

The problem resulting from the change of mode will be described with reference to FIGS. 6 to 9.

The camera mode solution as described above is based on a coding included inside a complete input frame (20 ms). Therefore any change from camera mode to film mode can be made simply at the next frame as shown on FIG. 6. Picture K is in camera mode. So it is coded on 20 ms with two groups of sub-fields. A change of mode is detected between Picture K and Picture K+1. Picture K+1 and Picture K+2 are identical while Picture K+3 is different from Picture K+2. So, the film mode coding on three groups of sub-fields in a 40 ms frame raster can been made. However, the opposite is not true.

Figure 7:
FIG. 7 is a picture wherein camera mode and film mode are mixed.

It can happen that there is a need to switch back from film-mode to camera-mode rapidly. This is, for instance, the case with mix-mode materials that are film-mode sources where some information has been added later in a camera-mode format (e.g. adding of ticker-tape at the broadcasting level). Such a ticker-tape sequence is shown in FIG. 7. FIG. 7 illustrates the case of mix-mode where a text in camera-mode has been added on a film mode material. In this figure, the both fields (odd and even) combined together are shown. It is easy to see that there is no intra-field motion in the background whereas there is an intra-field motion on the text (teeth aspect of the letters). The customer will see this aspect of the picture if the specific film-mode sub-field coding is used on a mix-mode material: the text becomes unreadable.

Figure 8:
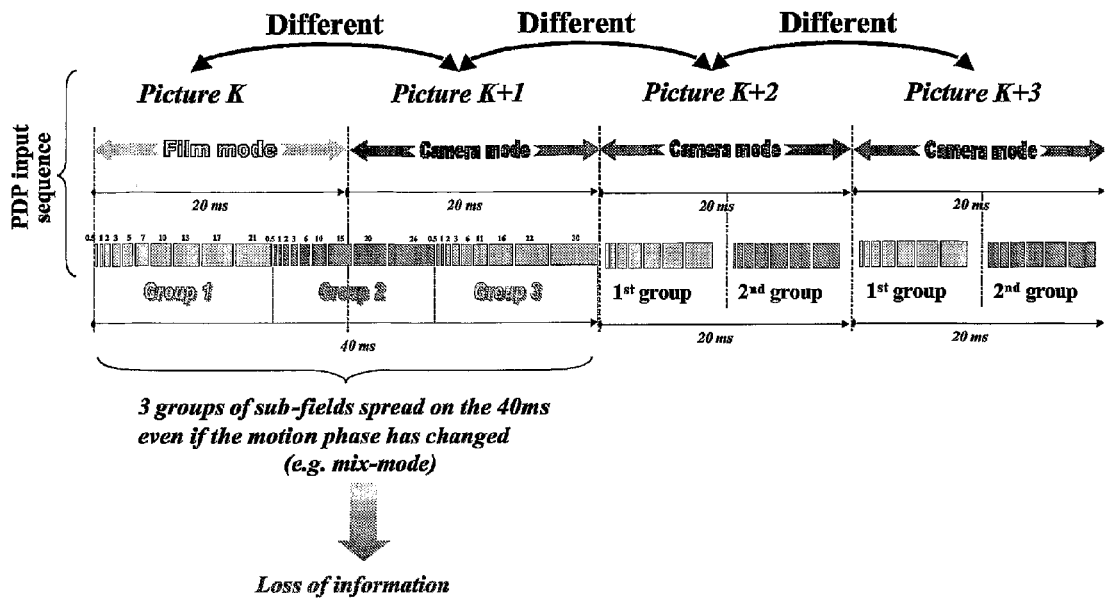
FIG. 8 is a representation of the problem faced when camera mode and film mode are mixed.

This wrong situation is illustrated in FIG. 8 where the change of the mode is correctly detected but where it is waited for switching from one mode to another until all sub-fields from film-mode code are displayed. On the left part of FIG. 8, the picture referenced Picture K, coming from a film mode source is coded on three groups of sub-fields spread on 40 ms frame raster. Even if a change of mode is detected between Picture K and Picture K+1, Picture K+1 is coded as being identical to Picture K. It is only at the end of the 40 ms frame raster that the mode can be switched to camera mode. Pictures K+2 and K+3 are each coded on two groups of sub-fields in a 20 ms frame raster. In that situation, it is necessary to switch back to camera-mode rapidly and this can occur even in intra-field. The present invention proposes a specific solution enabling to go back from film-mode coding to camera-mode coding even in the middle of the coding in three groups of sub-fields spread on the 40 ms frame raster.

Figure 9:
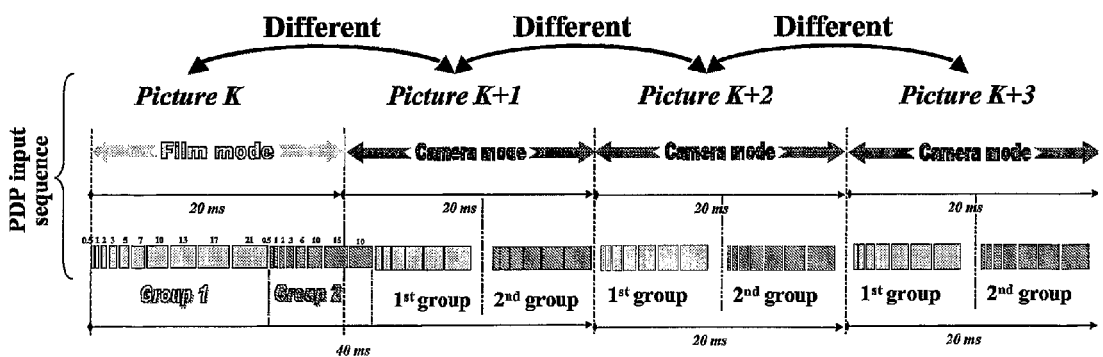
FIG. 9 shows a specific solution for switching back mode from film mode coding to camera mode coding.
Figure 10:
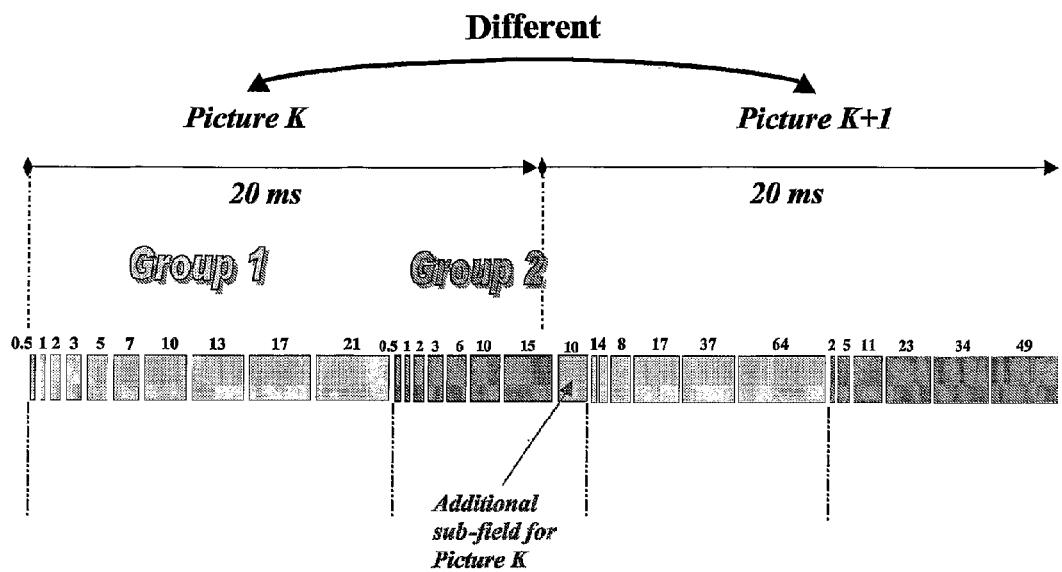
FIG. 10 shows the sub-field organisation used in FIG. 9.

This concept is illustrated in FIGS. 9 and 10. FIG. 9 illustrates the new concept for rapid switching back of coding from film-mode dedicated solution to general camera-mode solution and FIG. 10 is more dedicated to the instant transition from film mode to camera mode.

First of all, taking the assumption that a camera-mode situation has been detected on Picture K+1 whereas a film-mode coding for both picture K and picture K+1 is used. As soon as the Picture K+1 is detected, the display of Picture K has to be finished. However, in case of film-mode coding, 255.5 levels are used to render two pictures, so 128 are enough to render the Picture K. Therefore, at the beginning of the frame K+1, a sub-field enabling to finalize the 128 required levels for picture K will be used. Using the following sub-field structure does this:

The time used for Picture K (20 ms) enables to display following sub-fields:
Group 1: 0.5-1-2-3-5-7-10-13-17-22
Beginning of Group 2: 0.5-1-2-3-6-10-15
This corresponds to a sum of 118 video levels. Therefore, it is necessary to add at the beginning of frame K+1 a sub-field of weight 10 corresponding to the missing energy to render correctly Picture K. Using a specific LUT (Look Up Table), the coding of this level is done at the beginning of frame K+1. Then, for picture K+1, a sub-field code based on 255 levels but wherein two divides the total number of sub-fields is used. However, fewer sub-fields are to be used since a part of the frame K+1 is still occupied by one sub-field from Picture K. Such a possible code based on 12 sub-fields is given below:
1-4-8-17-37-64-//-2-5-11-23-34-49

So finally the structure used is given in FIG. 10 for the two pictures K and K+1.

Figure 11:
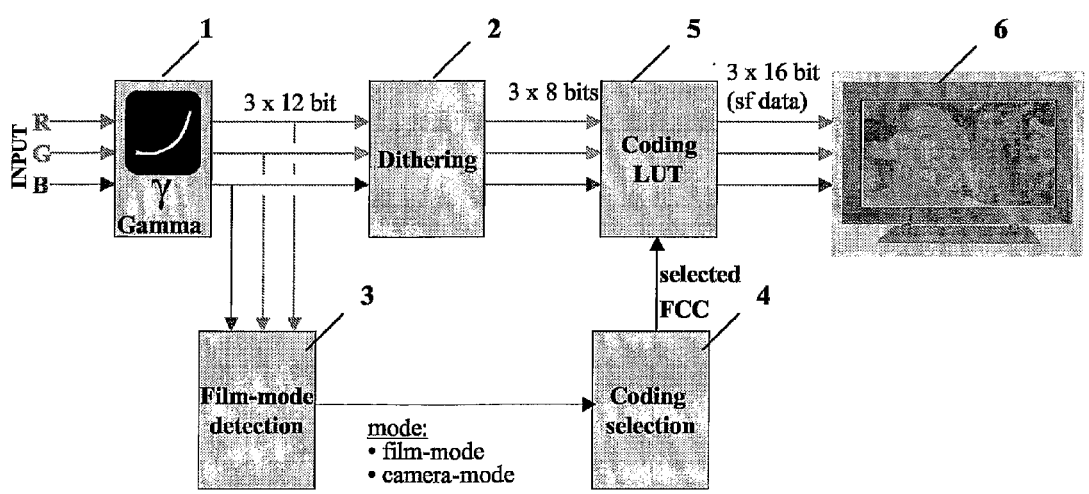
FIG. 11 is a schematic of an apparatus for implementing the present invention.

The present invention is implemented in an apparatus as shown in FIG. 11. The input R, G, B picture is forwarded to a gamma block 1 performing a quadratic function under the form $$\text{Out} = 4095 \times \left(\frac{\text{Input}}{\text{MAX}}\right)^{\gamma}$$

where γ is more or less around 2.2 and MAX represents the highest possible input value. The output is done on 12 bits to be able to render correctly low levels.

The output of the gamma block 1 is forwarded to two different blocks:
A dithering function block 2 enabling to render correctly the video (more visible levels)
A film-mode detection block 3 performing a detection of the current input video format.

The output of the film-mode detection block 3 is forwarded to a coding selection block 4 which takes care of the right choice of the coding:
Coding with two groups of sub-fields in a 20 ms frame raster for camera-mode solution
Coding with three groups of sub-fields in a 40 ms frame raster for film-mode selection
Specific switching mode while going from film-mode to camera-mode in intra-field Once the right coding has been selected, the block 5 will select the right LUT (Look Up Table) for encoding the video in sub-fields, which will be then forwarded to the PDP screen 6.

The present invention is not restricted to the disclosed embodiments. Various modifications are possible and are considered to fall within the scope of the claims. E.g. the number and weights of the used sub-fields can vary from implementation to implementation.

All kinds of displays, which are controlled by using PWM like control for grey level variation can be used in connection with the invention.

The invention claimed is:
1. Method for processing video pictures and displaying them on a pulse-width modulation-driven display device, the video pictures consisting of pixels digitally coded, the digital code word determining the length of the time period during which the corresponding pixel of a display is activated, wherein to each bit of a digital code word a certain activation duration called sub-field is assigned, the sum of the duration of the sub-fields according to a given code word determining the length of the time period during which the corresponding pixel is activated, said method comprising the following steps:

detecting the video pictures source mode and the parity between pictures, if the source is in film mode, distributing the total number of sub-fields used for two frame raster in three groups of sub-fields and assigning to a value of a pixel a code word that corresponds to the distribution of the active sub-fields period over the three sub-fields groups, and if the source is in camera mode, distributing the total number of sub-fields used for each frame raster in two groups of sub-fields and assigning to a value of a pixel a code word that corresponds to the distribution of the active sub-fields period over the two sub-fields groups.

2. Method according to claim 1, wherein each one of the three groups of sub-fields or each one of the two groups of sub-fields comprises a number of sub-fields equal or different by one.

3. Method according to claim 1, wherein the three groups of sub-fields in film mode and the two groups of sub-fields in camera mode have identical structure at least in terms of the most significant sub-fields.

4. Method according to claim 1, wherein the three groups of sub-fields have identical structure at least in terms of the least significant sub-fields.

5. Method according to claim 1, wherein the detection of the video pictures source modes and the parity between pictures is done by analysing the intra field motion.

6. Method according to claim 1, wherein the change of coding from the coding used in camera mode to the coding used in film mode is made at the next frame following the detection of a change between the source type.

7. Method according to claim 1, wherein the change of coding from the coding used in film mode to the coding used in camera mode is made using the following steps:

If in a two-frame raster, the first picture is in film mode and the second picture is in camera mode, add at the beginning of the second frame, a sub-field having a weight such that the total activation duration of the sub-fields of the first frame and said sub-field is substantially equal to the total activation duration of the sub-fields of two groups of subfields of a camera mode picture, Code the second picture using two groups of sub-fields with a total number of sub-fields less than the total number of subfields for a camera mode picture and a total activation duration equal to the time period for displaying a camera mode picture, then Code the following pictures using two groups of sub-fields with a total number of sub-fields having a total activation duration equal to the time period for displaying a camera mode picture.

8. Apparatus wherein it adapted to carry out the method according to claim 1.

* * * * *